Patented Nov. 16, 1926.

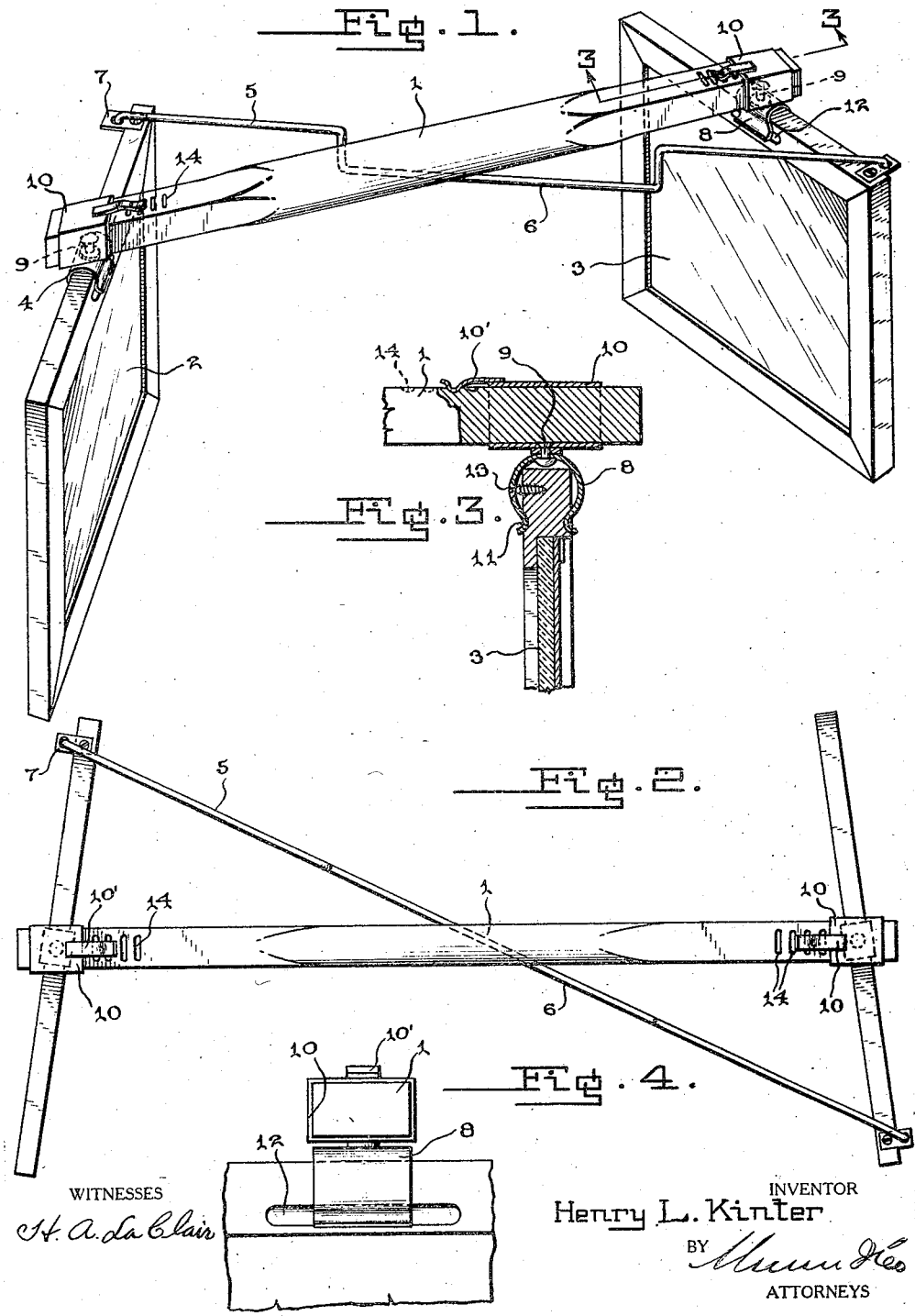

1,607,163

UNITED STATES PATENT OFFICE.

HENRY L. KINTER, OF CURRAN, ILLINOIS.

COORDINATED MIRROR.

Application filed August 13, 1925. Serial No. 50,103.

This invention relates to coordinated mirrors, and particularly to a type of device especially adapted for use by barbers or hairdressers in which a pair of mirrors are placed, one before, and one behind the head of the person receiving the hair cut or treatment so that he or she may inspect the appearance of the work by viewing in the forward mirror the image of the back of the head, reflected from the rearward mirror.

The present invention has for its principal object the provision of a device of the character described in which the mirrors are so connected and coordinated that a shift in the angular position of one causes a corresponding angular shift but in the position of the other, in a reverse direction, whereby the aggregate relative change in the direction of the two mirrors is equal to the sum of the angular deflections of both mirrors, the advantage of this being that but a slight angular adjustment of the forward mirror is required to give a complete panoramic view of the back of the head, as contrasted with the extensive angular movement of the mirror which is necessary to accomplish the same result, when a movable mirror is shifted in front of a fixed mirror.

Other objects of the invention relate to novel features of structural details which will appear as the following description of a preferred embodiment of my invention proceeds.

In the drawings:

Figure 1 is a perspective view of my coordinated mirrors assembled,

Figure 2 is a plan view of the same,

Figure 3 is a section through one of the swivel clamps,

Figure 4 is an end elevation of one of said clamps.

Referring now in detail to the several figures, the numeral 1 represents a handle, having the mirrors 2 and 3 pivotally and slidably suspended therefrom from adjacent the opposite ends thereof by means of the swivel clamps 4. A link 5 is pivotally connected to the upper corners of mirrors at points on opposite sides of the handle 1, so that a line through the points of connection of the link with the mirrors intersects and crosses the line through the points of connection of the mirrors with the handle.

The handle is of such length that it may be conveniently held at the medial portion above the head of the customer in the barber's chair, with the mirrors at appropriate distances in front of and to the rear of the head. The customer tilts the front mirror laterally, to differentiate vertical planes, the angular movement being communicated by means of the link 5 to the rear mirror imparting to it a corresponding angular movement in a reverse direction. It is apparent that by a very slight tilting of the front mirror, the angularity of the mirrors changes sufficiently to enable the customer, looking into the front mirror to view a complete panoramic image of the back of the head. The link 5 crosses the handle 1 in a position to pass through the hand which grasps the handle, so that the barber can exercise a retardative control upon extreme movements which may be imparted to the mirror by a customer inexperienced in its use.

The link 5 as shown, has its end portions lying in substantially the same horizontal plane as the handle, and is therefore formed with a medial downwardly offset portion 6 adjacent the medial portion of the handle which allows for the range of angular deflection of the mirrors and also limits the range of such deflection. The pivotal connections of the ends of the link 5 with the mirrors are preferably perforated lugs 7 secured to the mirrors and projecting beyond them and with which the angularly bent ends of the link 5 detachably connect.

The clamps 4 each preferably consists of a resilient mirror engaging clip 8 which may be rigidly but removably secured to the mirror frame by means of a screw 13 or similar fastener. A pin or bolt 9 connects the clip to a ferrule 10 which is square shaped in cross section to receive the handle. A spring tongue or pawl 10' is secured to the upper face of the ferrule at one end and normally presses against the handle and frictionally maintains the ferrule in position thereon. Notches 14 are provided in the upper face of the handle to receive said spring and prevent accidental dislodgement thereof. If desired the ferrule may be fixedly attached to the handle by means of a screw, nail or similar device. The jaws 11 of the clips 8 grip the mirrors in longitudinal channels or depressions 12 formed in the top rails of the frames of the mirrors, said depressions being longer than the width of the clips, so that the mirrors may be shifted laterally with respect to their pivoted connections with the handle, thereby providing an additional adjustment for the mirrors. It is obvious from the foregoing description, that the mirrors may be readily detached from the handle and link, when desired, as for the purpose of polishing them.

It is to be understood that such alterations, substitutions or departures from the illustrative embodiment of my invention herein described, are permissible under the terms of my patent as are sanctioned by the scope of the appended claims.

I claim:—

1. In a device of the class described, a supporting handle, mirrors adjustably suspended at spaced points from said handle, and a link pivotally connecting the reverse upper corners of said mirrors in a straight line, said link lying in a vertical plane which intersects a vertical plane through the points of adjustable connection of said mirrors with said handle.

2. In a device of the class described, a supporting handle, mirrors pivotally suspended at spaced points from said handle in planes perpendicular to the common horizontal plane of the handle, and a link pivotally connecting the reverse upper corners of said mirrors in a straight line said link disposed in a vertical plane which intersects a vertical plane through the points of pivotal connection of said mirrors with said handle.

3. In a device of the class described, a handle, mirrors pivotally and slidably mounted at spaced points on said handle in depending relation thereto, and a link the end portions of which lie substantially in the horizontal plane of said handle, and pivotally connect the reverse upper corners of said mirrors in a straight line which intersects a straight line through the points of pivotal connection of said mirrors with said handle, said link having its medial portion offset to permit free adjustment of said mirrors in angular vertical planes.

4. In a device of the class described, a supporting handle, clips pivotally suspended from the same adjacent the ends of said handle, mirrors detachably carried by said clips in depending relation to said handle, and a link the end portions of which lie substantially in the horizontal plane of said handle, pivotally connecting said mirrors at points in a straight line which intersects a straight line through the points of pivotal connection of said mirrors with said handle.

5. A device as set forth in claim 4, characterized by said mirrors being also slidably mounted in the said clips.

HENRY L. KINTER.